(12) United States Patent
Cohen

(10) Patent No.: US 6,760,649 B2
(45) Date of Patent: Jul. 6, 2004

(54) THERMAL MANAGEMENT OF A LAPTOP COMPUTER

(75) Inventor: Mark Evan Cohen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/153,713

(22) Filed: May 22, 2002

(65) Prior Publication Data

US 2003/0220721 A1 Nov. 27, 2003

(51) Int. Cl.[7] .............................................. G05D 23/00
(52) U.S. Cl. ....................... 700/299; 700/300; 700/301; 702/139
(58) Field of Search ................................ 700/299, 300, 700/301; 713/322; 702/139; 236/1 C, 91 D, 49.3; 165/80.3

(56) References Cited

U.S. PATENT DOCUMENTS

| | | | |
|---|---|---|---|
| 5,713,030 A | * | 1/1998 | Evoy .......................... 713/322 |
| 5,793,609 A | | 8/1998 | Donahoe et al. |
| 5,907,487 A | | 5/1999 | Rosenberg et al. |
| 6,082,623 A | * | 7/2000 | Chang ....................... 236/49.3 |
| 6,115,249 A | * | 9/2000 | Cipolla et al. .............. 361/687 |
| 6,166,904 A | | 12/2000 | Kitahara et al. |

FOREIGN PATENT DOCUMENTS

| | | |
|---|---|---|
| JP | 2001177279 A | 6/2001 |
| WO | WO 99/10797 | 3/1999 |

* cited by examiner

*Primary Examiner*—Leo Picard
*Assistant Examiner*—Charles Kasenge
(74) *Attorney, Agent, or Firm*—J. Bruce Schelkopf; Bracewell & Patterson LLP

(57) ABSTRACT

A method and system for adjusting a temperature of a bottom of a laptop computer housing depending on where the laptop computer is placed during operation. If the laptop computer is placed on a lap of a user, or alternatively on any surface that has direct contact with the bottom of the laptop computer housing, sensors on the bottom of the laptop computer housing are activated. The sensors produce a signal to initiate supplemental cooling measures to reduce the temperature of the bottom of the laptop computer housing. Cooling measures taken include decreasing an operating speed of logic circuits such as a central processing unit (CPU) or increasing cooling fan output.

25 Claims, 5 Drawing Sheets

THERMAL MANAGEMENT OF A LAPTOP COMPUTER

BACKGROUND OF THE INVENTION

1. Technical Field

The present invention relates in general to the field of computers, and, in particular, to portable laptop computers. Still more particularly, the present invention relates to an improved method and system for detecting when a laptop computer housing is positioned on a user's lap, thus requiring adjustment to a heat management system of the computer to cool the bottom of the computer housing to prevent discomfort or injury to the user.

2. Description of the Related Art

Personal computers, including laptop computers, have acquired very high levels of computing power despite their relatively small size. Much of this computing power is due to the use of high density integrated circuit packages, including a central processing unit (CPU). These high density integrated circuit packages, and particularly the CPU, use a significant amount of electricity, which generates high levels of local heat within the laptop computer housing. For example, a typical CPU is rated to operate normally at temperatures up to 100° C. (212° F.) while generating over 50 watts of heat. This heat radiates throughout the computer housing, including the bottom surface of the computer housing. Under normal operating conditions, when placed on a desktop or other solid surface, the bottom of the computer housing does not get hot enough to pose a fire hazard or a serious health risk. However, despite the laptop computer's name, even under normal operating conditions the bottom of the laptop computer can get hot enough to cause discomfort or, in extreme conditions, even injury to a user who operates the laptop computer on the user's lap.

Thus, there is a need for a temperature control method and system for a laptop computer that is dependent on where the laptop computer is placed during operation, particularly with reference to placement of the laptop computer on the user's lap.

SUMMARY OF THE INVENTION

The present invention provides a method and system for detecting when a laptop computer is placed on a lap of a user, thus indicating the need to keep the bottom of the laptop computer at a lower temperature to enhance the user's desired comfort level. The temperature of the bottom of the laptop computer is controlled by adjusting the amount of heat that radiates from an interior of the laptop computer housing to the bottom of the laptop computer housing. When the laptop computer is placed on the lap of the user, or alternatively another surface that has direct contact with the bottom of the laptop computer housing, sensors on the bottom of the laptop computer housing are activated. The sensors provide a signal to the laptop computer to initiate supplemental cooling measures to reduce the temperature of the bottom of the laptop computer housing. Supplemental cooling measures taken may include decreasing an operating speed of logic circuits such as a central processing unit (CPU), or increasing a cooling fan output.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 2b illustrates a thermal control circuit (TCC) for the CPU depicted in FIG. 2a;

DETAILED DESCRIPTION OF THE PREFERRED EMBODIMENT

Figure 1:
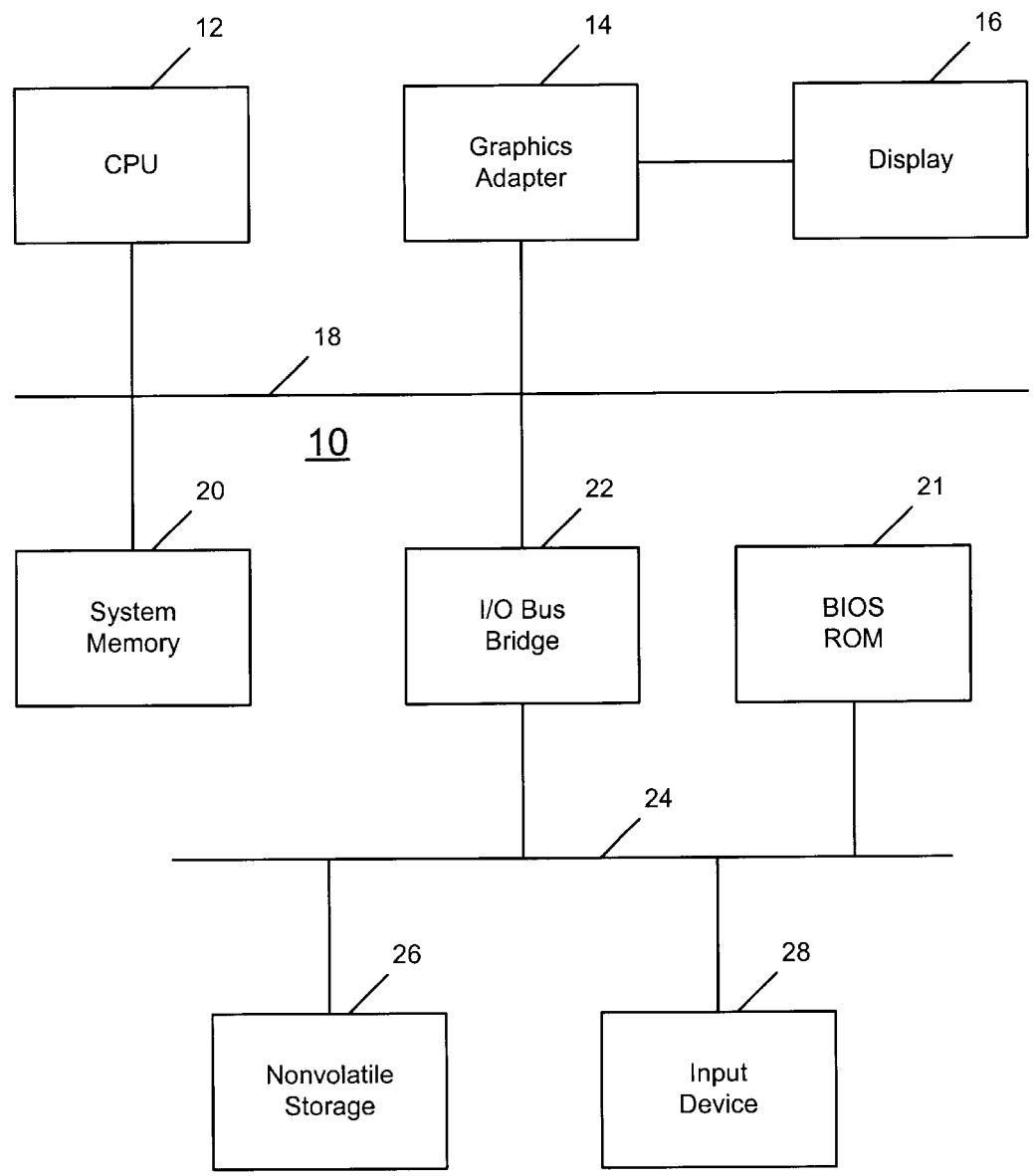
FIG. 1 is a block diagram of an exemplary computer system used in the present invention.

With reference now to the figures and, in particular to FIG. 1, there is depicted a block diagram of a data processing system in which a preferred embodiment of the present invention may be implemented. Data processing system 10 may be, for example, one of the models of personal computers available from International Business Machines Corporation of Armonk, N.Y. Preferably, data processing system 10 is a laptop computer or a similar computer having a full-sized computer display 16. Data processing system 10 includes a central processing unit (CPU) 12, which is connected to a system bus 18. In the exemplary embodiment, data processing system 10 includes a graphics adapter 14 also connected to system bus 18, receiving user interface information for a display 16.

Also connected to system bus 18 are a system memory 20 and an input/output (I/O) bus bridge 22. I/O bus bridge 22 couples an I/O bus 24 to system bus 18, relaying and/or transforming data transactions from one bus to the other. Peripheral devices such as nonvolatile storage 26, which may be a hard disk drive, and input device 28, which may include a conventional mouse, a trackball, or the like, is connected to I/O bus 24. Also connected to I/O bus 24 is a BIOS ROM 21, which contains a startup Power On Self-Test (POST) program. Contents of BIOS ROM 21 are located in a special region of CPU 12's memory address space that CPU 12 accesses automatically upon start-up.

The exemplary embodiment shown in FIG. 1 is provided solely for the purposes of explaining the invention and those skilled in the art will recognize that numerous variations are possible, both in form and function. For instance, data processing system 10 might also include a compact disk read-only memory (CD-ROM) or digital video disk (DVD) drive, a sound card and audio speakers, and numerous other optional components. All such variations are believed to be within the spirit and scope of the present invention.

Figure 2A:
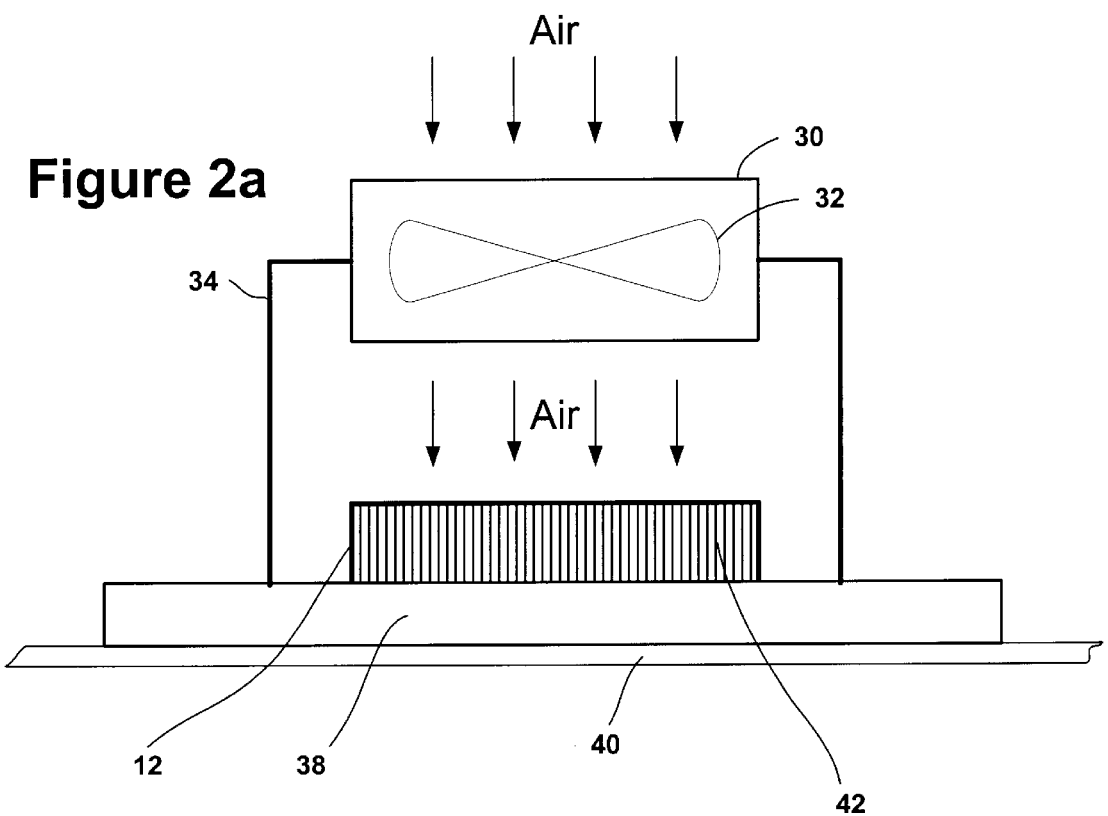
FIG. 2a depicts a cooling fan for a central processing unit (CPU) in the exemplary computer system.

The CPU 12 described in FIG. 1 is preferably a microprocessor such as the Mobile Intel® Pentium® 4 processor or the Power PC™ manufactured by International Business Machines, Inc. of Armonk, N.Y. With reference now to FIG. 2a, such an exemplary microprocessor is depicted as CPU 12, which is mounted in a socket 38, which is connected to a printed circuit board 40 for connection to other components in data processing system 10 depicted in FIG. 1. Preferably, socket 38 includes a processor and fan heatsink (not shown) that facilitates conductive dissipation of heat away from CPU 12.

In FIG. 2*a*, mechanical cooling of CPU 12 is depicted in an exemplary form using a fan 32. Fan 32 is mounted in a fan housing 30, which is supported above CPU 12 by a fan housing support bracket 34. Mechanical cooling of CPU 12 is accomplished by fan 32 forcing cooling air across CPU 12 and a plurality of cooling vanes 42 abutting CPU 12. Cooling vanes 42 provide additional surface area to improve heat transfer away from CPU 12, both passively and with the aid of forced air from fan 32. As readily understood by those skilled in the art, other types of heat dissipation may be used with the present invention, including, but not limited to, heat pipes and/or remote heat exchangers (not shown).

Figure 2B:
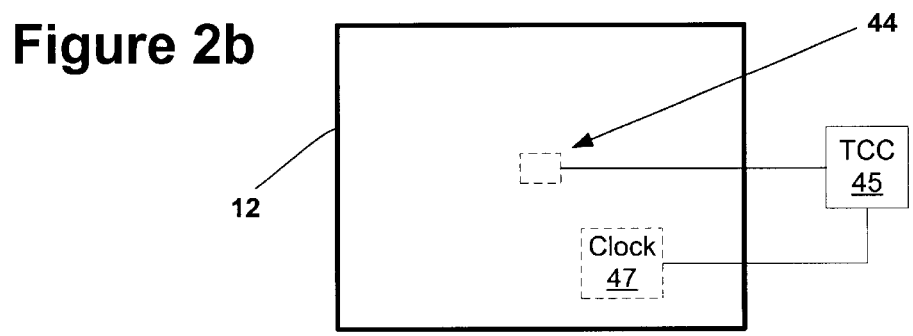

With reference now to FIG. 2*b*, there is depicted a CPU thermocouple 44, preferably a factory tuned, precision on-die thermal sensor, which is exemplarily mounted on an interior surface of a top of CPU 12. CPU thermocouple 44 provides a signal that is representative of a surface temperature of CPU 12. The signal from CPU thermocouple 44 is processed either with hardware or software to provide a required level of cooling to CPU 12. For example, CPU thermocouple 44 can provide a signal, typically analog in nature, to hardware that, when a threshold signal level is reached indicative of a upper limit temperature, switches on fan 32 or increases the rotational speed of fan 32. Alternatively, CPU thermocouple 44 can provide an analog signal that is processed into a digital signal, which is then interpreted and processed by software in CPU 12 or other logic circuitry to turn on or speed up fan 32 when the surface temperature of CPU 12 reaches a threshold limit.

In a preferred embodiment, the analog signal generated by CPU thermocouple 44 is converted into a digital signal by thermal control circuit (TCC) 45, which controls a temperature of CPU 12 by modulating (starting and stopping) a processor core clock 47 shown in FIG. 2*b*. Preferably, processor core clock 47 can be modulated only when TCC 45 is activated. CPU 12 has two modes that activate TCC 45: automatic mode and on-demand mode. In a preferred embodiment, TCC 45 can be implemented either physically in a circuit (not shown), as code in a dedicated processor (not shown), or virtually as power management code in CPU 12 itself. TCC 45 is illustrated as a discrete function in this application for purposes of clarity.

Automatic mode is required for CPU 12 to operate within pre-determined specifications, and must first be enabled by instructions from the BIOS ROM 21 shown in FIG. 1. Once automatic mode is enabled, TCC 45 will activate only when a temperature within CPU 12, as measured by CPU thermocouple 44, reaches a pre-determined level. This pre-determined temperature level within CPU 12 is the temperature that will result in an upper allowable temperature level at the bottom of a laptop housing. That is, since CPU 12 accounts for the majority of heat generated within a laptop data processing system 10, controlling the temperature of CPU 12 will have the primary control of the temperature of data processing system 10, including a computer housing surrounding data processing system 10. In particular, when data processing system 10 is a laptop computer, controlling the temperature of CPU 12 will result in controlling the temperature of the bottom of the laptop computer housing.

In the automatic mode, processor core clock 47 is modulated by alternately turning off and on at a duty cycle specific to CPU 12. Cycle times are processor speed dependent and decrease linearly as processor core frequencies increase. Once the temperature of CPU 12 returns below the pre-determined threshold, modulation ceases and TCC 45 goes inactive. A small amount of hysterisis is preferably included to prevent rapid active/inactive transitions of TCC 45 when the temperature of CPU 12 is near the threshold.

TCC 45 may also be activated via on-demand mode, wherein the duty cycle of the clock modulation is programmable. In automatic mode, the duty cycle is fixed, while in on-demand mode, the duty cycle can be programmed to different on/off ratios.

Figure 3A:
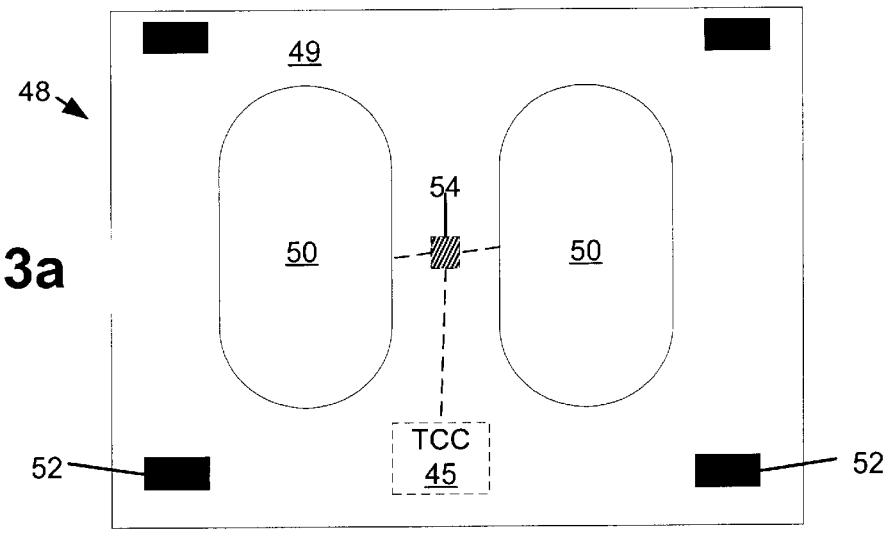
FIGS. 3a–3c depict pressure sensors and a temperature sensor on a bottom of a laptop computer housing.
Figure 3B:
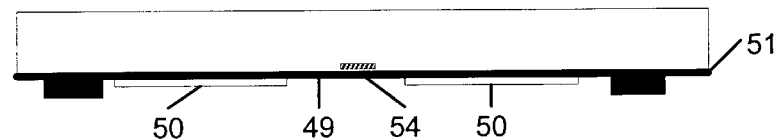

Referring now to FIG. 3*a*, there is depicted a bottom surface 49 of a laptop computer housing 48, which houses the data processing system 10 illustrated in FIG. 1. Mounted on bottom surface 49 are pressure sensors 50. Pressure sensors 50 may be two sensors, as depicted, or alternatively may be a larger number of sensors or may be a single sensor. As seen in FIG. 3*b*, pressure sensors 50 are mounted such that support legs 52 extend farther away from bottom surface 49 than pressure sensors 50. Thus, when data laptop computer housing 48 is placed on a flat surface such as a desktop, pressure sensors 50 are not contacted. However, when laptop computer housing 48 is placed on a moldable surface such as a lap of a user, pressure sensors 50 are contacted and generate a signal indicating that the laptop computer housing 48 is on the user's lap. Pressure sensors 50 may be micro switches, strain gauges, membrane switches or any other pressure sensing switch device known in the art of pressure sensing.

When pressure sensors 50 are activated by pressure, pressure sensors 50 send a signal to TCC 45 to adjust the temperature of CPU 12 to a level that will not result in bottom surface 49 becoming too hot. Preferably, this temperature adjustment is accomplished with the use of CPU thermocouple 44 as described above.

In an alternate preferred embodiment, CPU 12's temperature is controlled by pressure sensors 50 and casing thermal sensor 54. Using analog or digital circuitry (not shown), pressure sensors 50 send a signal to thermal sensor 54, thus activating thermal sensor 54. When the activated thermal sensor 54, which is mounted against either the interior or exterior of bottom surface 49, detects a temperature above a pre-determined safe and/or comfortable level, thermal sensor 54 sends a signal to TCC 45, located within laptop computer housing 48. That is, if pressure is applied to pressure sensors 50 from the user's lap, then a temperature signal is sent from thermal sensor 54 to TCC 45. If the temperature detected by thermal sensor 54 is higher than comfortable for the user, then thermal sensor 54 activates TCC 45 in a manner analogous to that described above using CPU thermocouple 44. That is, upon a signal from thermal sensor 54 that the bottom surface 49 is too hot and is resting on the user's lap (as detected by pressure sensors 50), TCC 45 slows down the speed of CPU 12 by slowing down processor core clock 47, thus allowing CPU 12 to cool down. When bottom surface 49 cools down to a predetermined temperature, CPU 12 is accelerated, after a hysterisis delay, back up to a higher clock speed.

In another preferred embodiment, cooling of laptop computer housing 48 and bottom surface 49 is accomplished by increasing the operation of fan 32 described in FIG. 2*a* and/or other fans (not shown) within laptop computer housing 48. The increased usage of fans may be in conjunction with slowing the speed and thus heat output of CPU 12 as described above, or increased usage of fans may be utilized instead of slowing down CPU 12.

Figure 3C:
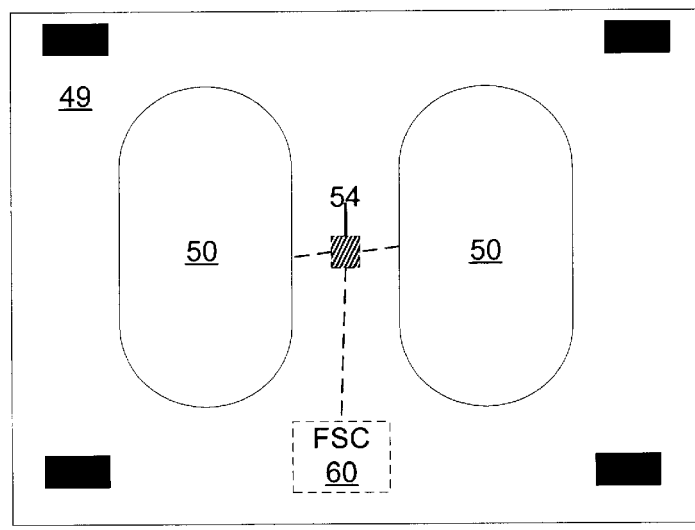

Increased usage of a fan, including fan 32, within laptop computer housing 48, is a function of fan speed controller (FSC) 60, as depicted in FIG. 3c. When pressure is detected by pressure sensors 50, indicating that laptop computer housing 48 is resting on the lap of the user, thermal sensor 54 is enabled. If the temperature of bottom surface 49 is too high, FSC 60 increases the output of a fan such as fan 32 for CPU 12, or any other cooling fan within laptop computer housing 48. The increased output is caused by either turning on the fan, or by increasing the speed of the fan if already running. The output of the fan is maintained at the higher level until thermal sensor 54 indicates a lower comfortable temperature at bottom surface 49. Alternatively, FSC 60 increases the use and/or speed of fan 32 upon a signal generated by a high temperature detected by CPU thermocouple 44.

Figure 4A:
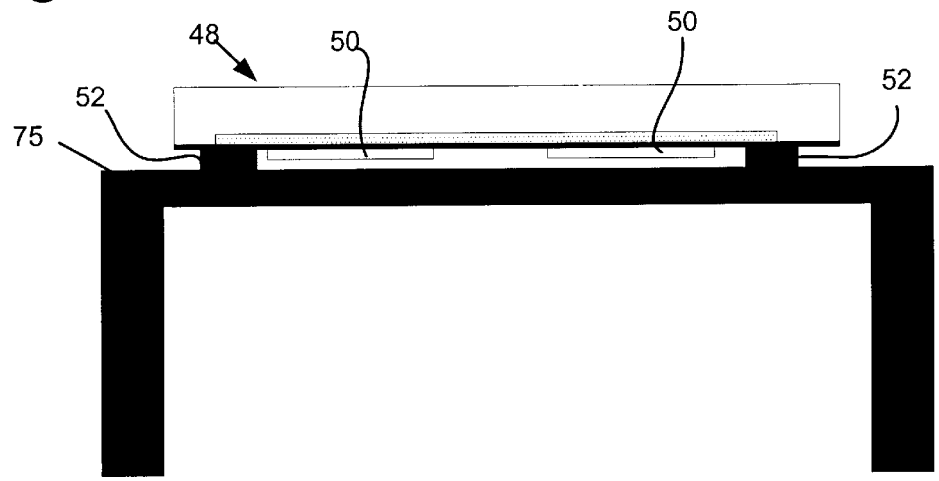
FIGS. 4a–4b illustrate a non-contact of the pressure sensors when the laptop computer is placed on a flat tabletop, and a contact of pressure sensors when a laptop computer is placed on a lap of a user.
Figure 4B:
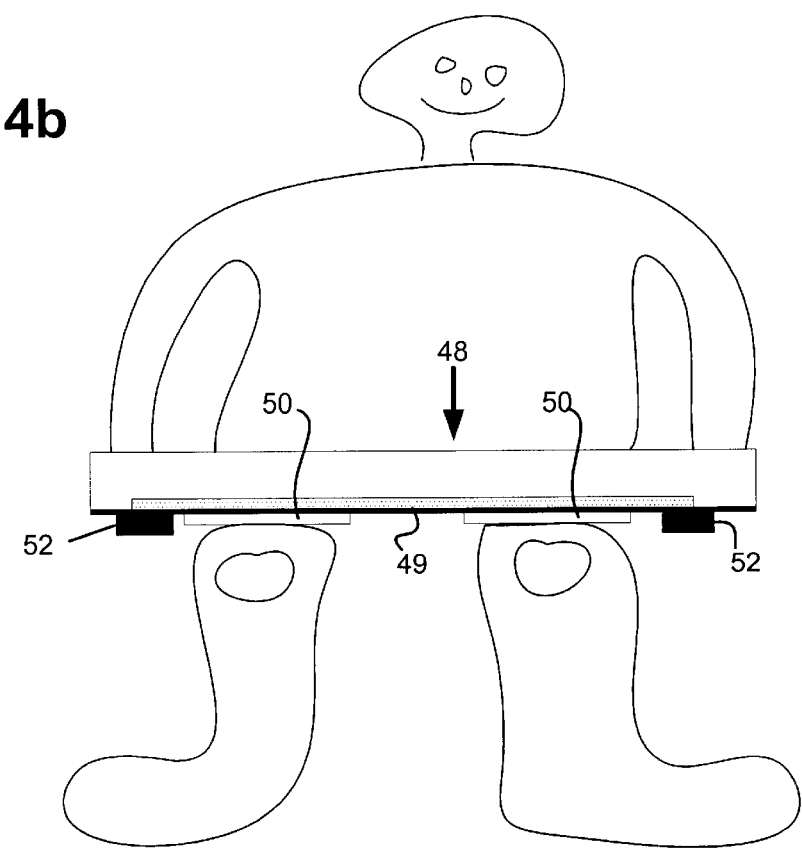

With reference now to FIGS. 4a and 4b, there is depicted the present invention while placed on a flat table top 75 (FIG. 4a) or a user's lap (FIG. 4b). As seen in FIG. 4a, when placed on flat table 75, laptop computer housing 48 is supported by support legs 52, thus avoiding any pressure against pressure sensors 50. Without pressure being detected against pressure sensors 50, TCC 45 does not alter its normal settings and operation to further reduce the temperature of a computer bottom surface 49, nor is the operation of fan 32 increased. However, when the laptop computer housing 48 is placed on a user's lap, as depicted in FIG. 4b, computer bottom surface 49 is now supported, along with laptop computer housing 48, by the lap (legs) of the user. The user's legs press against pressure sensors 50, causing TCC 45 to adjust CPU clock speed as described above, resulting in computer bottom surface 49 having a lower temperature to avoid burning the lap of the user. Alternatively, pressure on pressure sensors 50 results in additional fan usage as described above. Note that when placed on the lap of the user, the CPU clock speed and/or the fan usage are adjusted to control the temperature of computer bottom surface 49. That is, the CPU clock speed may be adjusted, the fan usage may be adjusted, or both the CPU clock speed and fan usage may be adjusted to control the temperature of the computer bottom surface 49.

Figure 5:
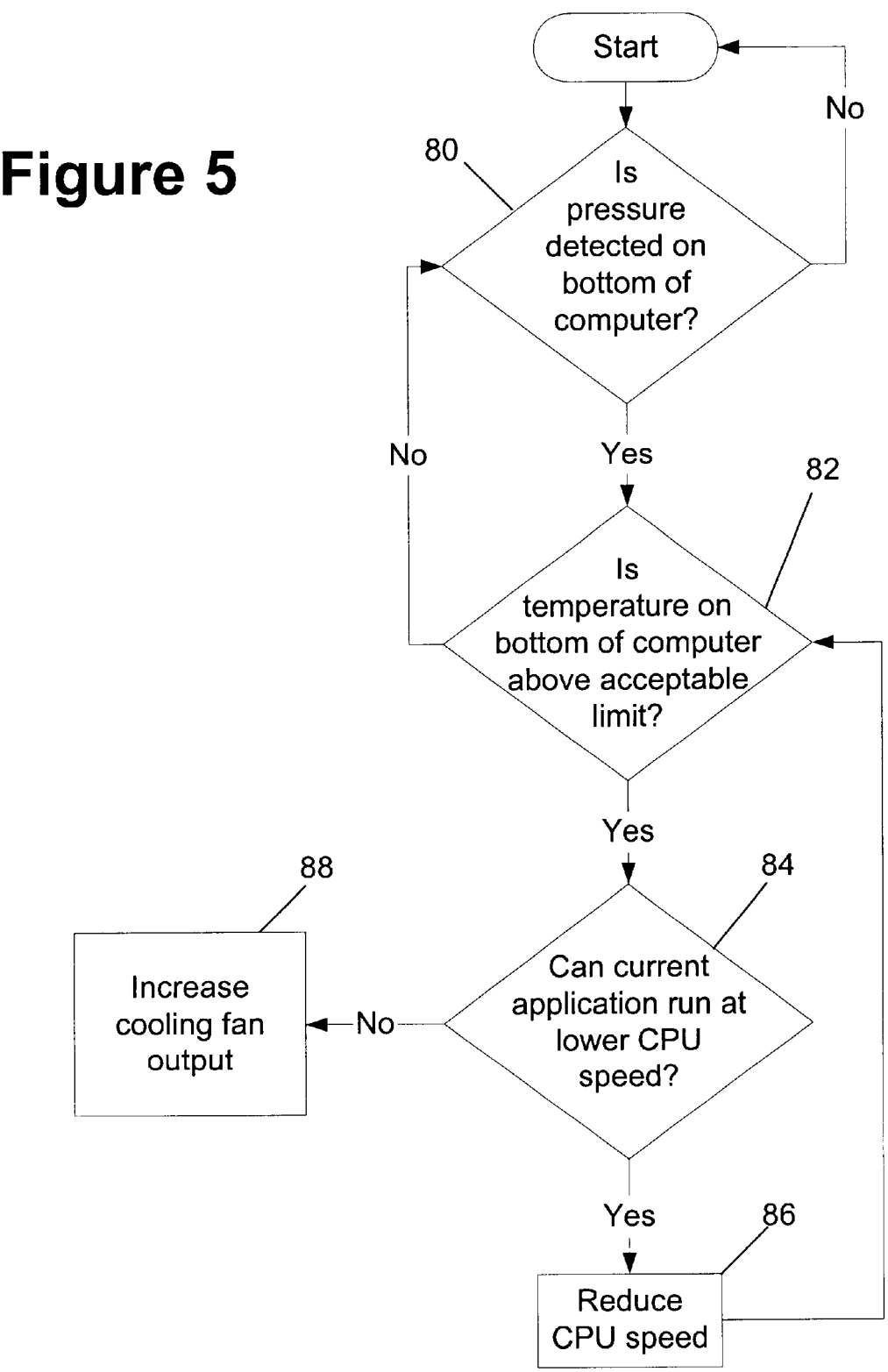
FIG. 5 is a flow-chart of logic used in the present invention for taking cooling measures for the laptop computer based on whether the laptop computer is placed on the lap of the user.

With reference now to FIG. 5, there is depicted a flow chart of a preferred embodiment of the present invention. Starting at query block 80, an inquiry is made as to whether pressure is detected on the bottom of the laptop computer. If not, then no further steps are taken, as it is assumed that the laptop is sitting on a desktop, and not on the lap of the user. If the computer is positioned on the user's lap, a query, as shown in block 82, is made as to whether the temperature on the bottom of the computer is above an acceptable level that is safe and comfortable for the user. The temperature on the bottom of the computer can be determined by a direct measurement of the temperature using thermal sensor 54 on the bottom of the computer, as described in FIGS. 3a–3c, or the temperature of the bottom of the computer may be determined indirectly based on the temperature of CPU 12 or some other component of the laptop computer, as described in FIG. 2b.

If the temperature on the bottom of the laptop computer is too high, a query, as shown in block 84, is made as to whether the program(s) currently running on the laptop computer can operate at a lower CPU speed. If so, the CPU speed is decreased as described above. If the CPU is running at a lowest acceptable speed, then the output of the cooling fan is increased, as shown in block 88, either by turning on the cooling fan or by speeding up the cooling fan.

It should further be appreciated that the method described above can be embodied in a computer program product in a variety of forms, and that the present invention applies equally regardless of the particular type of signal bearing media utilized to actually carry out the method described in the invention. Examples of signal bearing media include, without limitation, recordable type media such as floppy disks or compact disk read only memories (CD ROMS), and transmission type media such as analog or digital communication links.

While the invention has been particularly shown and described with reference to a preferred embodiment, it will be understood by those skilled in the art that various changes in form and detail may be made therein without departing from the spirit and scope of the invention.

What is claimed is:

1. A method for controlling a temperature of a computer housing for a computer, said method comprising:

detecting a pressure against an exterior of the computer housing; and upon detecting said pressure against said exterior of the computer housing, lowering a temperature of at least a portion of said computer housing.

2. The method of claim 1, further comprising:

measuring said temperature of said computer housing; and adjusting a cooling mechanism in the computer to lower said temperature to a predetermined level.

3. The method of claim 1, wherein the computer is a laptop computer, and said pressure is caused by the laptop computer being placed on a lap of a user.

4. The method of claim 2, wherein said cooling mechanism adjustment comprises increasing a usage of a cooling fan in the laptop computer to reduce said temperature.

5. The method of claim 4, wherein said increased fan usage is controlled by hardware means.

6. The method of claim 4, wherein said increased fan usage is controlled by software means.

7. The method of claim 1, further comprising:

adjusting a power usage of a component of the computer to reduce a temperature of said component of the computer.

8. The method of claim 7, wherein said component of the computer is a central processing unit.

9. The method of claim 8, wherein said power usage of said central processing unit is adjusted by adjusting a processing speed of said central processing unit.

10. A system for controlling a temperature of a computer housing for a computer, said system comprising:

means for detecting a pressure against an exterior of the computer housing; and means for, upon detecting said pressure against said exterior of the computer housing, lowering a temperature of at least a portion of said computer housing.

11. The system of claim 10, further comprising:

means for measuring said temperature of said computer housing; and means for adjusting a cooling mechanism in the computer to lower said temperature to a predetermined level.

12. The system of claim 10, wherein said computer is a laptop computer, and said pressure is caused by the laptop computer being placed on a lap of a user.

13. The system of claim 11, wherein said cooling mechanism adjustment comprises increasing a usage of a cooling fan in the laptop computer to reduce said temperature.

14. The system of claim 13, wherein said increased fan usage is controlled by hardware means.

15. The system of claim 13, wherein said increased fan usage is controlled by software means.

16. The system of claim 10 further comprising:
   means for adjusting a power usage of a component of the computer to reduce a temperature of said component of the computer.

17. The system of claim 16, wherein said component of the computer is a central processing unit.

18. The system of claim 17, wherein said power usage of said central processing unit is adjusted by adjusting a processing speed of said central processing unit.

19. A computer usable medium for controlling a temperature of a computer housing for a computer, said computer usable medium comprising:
   computer program code for detecting a pressure against an exterior of the computer housing; and
   computer program code for, upon detecting said pressure against said exterior of the computer housing, lowering a temperature of at least a portion of said computer housing.

20. The computer usable medium of claim 19, further comprising:
   computer program code for measuring said temperature of said computer housing; and
   computer program code for adjusting a cooling mechanism in the computer to lower said temperature to a predetermined level.

21. The computer usable medium of claim 19, wherein said computer is a laptop computer, and said pressure is caused byte laptop computer being placed on a lap of a user.

22. The computer usable medium of claim 20, wherein said computer program code for adjusting said cooling mechanism further comprises computer program code for increasing a usage of a cooling fan in the laptop computer to reduce said temperature.

23. The computer usable medium of claim 19, further comprising:
   computer program code for adjusting a power usage of a component of the computer to reduce a temperature of said component of the computer.

24. The computer usable medium of claim 23, wherein said component of the computer is a central processing unit.

25. The computer usable medium of claim 24, wherein said power usage of said central processing unit is adjusted by computer program code for adjusting a processing speed of said central processing unit.

* * * * *